March 10, 1959  J. WECKERLE  2,877,346
CONTROL CIRCUIT FOR F. M. TUNING INDICATOR TUBE
Filed Dec. 7, 1953

INVENTOR
J. WECKERLE
BY Philip M. Bolton
ATTORNEY

United States Patent Office 2,877,346
Patented Mar. 10, 1959

2,877,346

CONTROL CIRCUIT FOR F. M. TUNING INDICATOR TUBE

Josef Weckerle, Pforzheim, Germany, assignor to International Standard Electric Corporation, New York, N. Y., a corporation of Delaware Application December 7, 1953, Serial No. 396,561

Claims priority, application Germany December 11, 1952

1 Claim. (Cl. 250—27)

The invention relates to a circuit arrangement for controlling a tuning-indicator tube in a frequency-modulation receiver.

It is known to control a tuning-indicator tube by a circuit arrangement in which the control voltage is taken from the control grid of the limiter tube. Such an arrangement has the advantage that input voltages somewhat high may be utilized to control the indicator tube without having to undergo any limitation.

However, in such an arrangement the control characteristic, that is, the curve by which the indicating voltage is represented is slightly S-shaped. Thus, the indicating voltage does not increase uniformly, especially as regards the change from the lower region of the control characteristic to the middle one and thence to the upper region. Also where, for instance, a magic eye is used, the faintest carriers still receivable will not cause satisfactory luminous sectors to appear on the screen whereas overlap of such sectors can occur if the carriers are very strong.

The invention overcomes each of these drawbacks. According to the invention the control voltage for the tuning-indicator tube is taken from the control grid of the limiter tube and simultaneously from the frequency discriminator or ratio detector. The additional derivation of control voltage may be from the anode of the diode and preferably from the limiting condenser of the ratio detector.

According to a further development of the invention a uniform rise of the indicating voltage is accomplished by means of adequately dimensioned resistances included in the lead from the discriminator or ratio detector to the control system for the indicating tube and/or in the lead from the limiter tube to that control system as well as in the grounding wire from the last said lead. With the aid of said resistances the indicating voltage is so matched to the control characteristic of the indicator tube or magic eye that with the faintest carrier still receivable, clearly defined luminous sectors shall appear on the screen of the indicator tube while with the strongest carrier no overlap of the luminous sectors shall occur.

The invention is more fully explained hereafter, reference being had to the accompanying drawing in which one embodiment thereof is illustrated.

Figure 1:
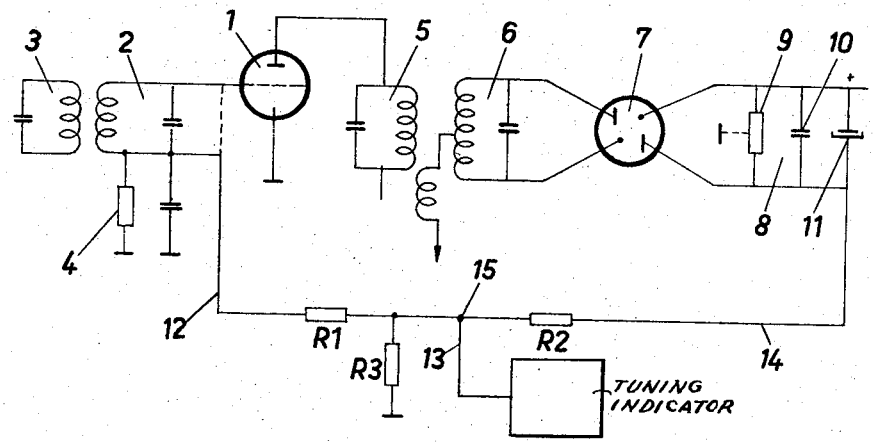
Fig. 1 shows one circuit arrangement of the invention.

1 denotes the limiter tube whose grid circuit 2 is coupled to the F. M. high frequency circuit 3. 4 is a grid leak resistance.

In the anode circuit of tube 1 a ratio detector is included in the well-known manner. This detector comprises the primary circuit 5 and the secondary circuit 6 associated with a two-way rectifier tube 7 and with the low frequency circuit 8. Circuit 8 contains the resistance 9, condenser 10, and an electrolytic condenser 11. For reasons of symmetry the resistance 9 may be center-tapped and grounded. The indicator tube (not shown) is connected to the grid of tube 1 over wires 12, 13. The dotted line from this grid represents an alternative connection. Joined to the negative electrode of the electrolytic condenser 11 is a wire 14, and this is connected at 15 to the wire 13. Wire 14 thus likewise leads to the control system for the indicator tube. In wire 14 the resistance R2 is included. Wire 12 contains resistances R1, R3. The function of these three resistances will become clear, when the operation of the circuit is explained in connection with Fig. 2.

Figure 2:
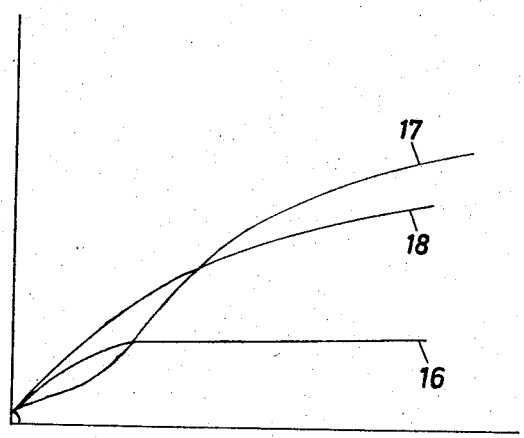
Fig. 2 is a graph representing the indicating voltages in dependence of the input voltages.

The ordinates in Fig. 2 are a measure of the indicating voltages while the abscissas are a measure of the appertaining input voltages.

Curve 16 is the control characteristic of an indicator tube in an F. M. receiver which has a ratio detector and a preconnected limiter stage and in which the control system for the indicator tube is joined to the anode of the diode or to the electrolytic condenser of the ratio detector. With rising input voltage the limiter effect causes a sharp bend to arise soon in the characteristic. From this bend onward the indicating voltage remains very nearly constant.

Curve 17 is the control characteristic obtained if the indicating voltage is taken only from the control grid of the limiter tube. This curve, being somewhat in the shape of an S, shows that with a small input voltage the resultant indicating voltage is smaller than that obtained in the arrangement operating as illustrated by curve 16. Input voltages belonging to the high region of curve 17 involve the risk of the indicator tube becoming overcontrolled, the luminous sectors on the screen of a magic eye, for instance, becoming overlapped whereas the received transmissions of low radiation will hardly be perceptible as luminous sectors.

Curve 18 shows the arrangement according to the invention and illustrates the combination effect that the indicating voltage rises uniformly in dependence of the input voltage. With the aid of the resistances R1, R2, R3 the characteristic can be still further adjusted to the desired conditions. In particular the indicating voltage can be so matched to the control characteristic of the indicator tube or magic eye that the weakest radiation which is still received produces well-defined luminous sectors on the screen of the magic eye, and the strongest radiations are not able to cause overlap of such sectors. One indicating system will hence suffice for dealing with the entire range.

The filtering of the control voltage is accomplished in a well-known manner. A suitable switch may of course be arranged to permit the indicator tube to switch from F. M. to A. M. operation.

What is claimed is:

A frequency modulation receiver comprising a limiter circuit including an electron tube having cathode, grid and anode electrodes, a ratio detector circuit coupled to the output of said limiter circuit and comprising a pair of diodes, a capacitor having one electrode connected to the anode of one of said diodes and the other electrode connected to the cathode of the other of said diodes, a tuning indicator device, a common control lead coupled to said tuning indicator device, a first galvanic connection including a first resistor connected between the grid circuit of said limiter tube and said common control lead and a second galvanic connection including a second resistor connected between one electrode of said capacitor and said common control lead.

(References on following page)

References Cited in the file of this patent

UNITED STATES PATENTS

| | | |
|---|---|---|
| 2,273,098 | Foster | Feb. 17, 1942 |
| 2,286,412 | Herold | June 16, 1942 |
| 2,514,327 | Grant | July 4, 1950 |
| 2,572,424 | Amos | Oct. 23, 1951 |
| 2,595,441 | Avins | May 6, 1952 |
| 2,686,259 | Koch | Aug. 10, 1954 |
| 2,743,361 | Bauman | Apr. 24, 1956 |

FOREIGN PATENTS

| | | |
|---|---|---|
| 105,311 | Australia | Sept. 27, 1938 |